(12) United States Patent
Krause et al.

(10) Patent No.: US 7,955,752 B2
(45) Date of Patent: Jun. 7, 2011

(54) REDUCTION OF VOLTAGE LOSS BY VOLTAGE CYCLE THROUGH THE USE OF SPECIALLY FORMED BIPOLAR PLATES

(75) Inventors: Bernd Krause, Florersheim (DE); Joerg Roth, Trebur (DE)

(73) Assignee: GM Global Technology Operations LLC, Detroit, MI (US)

( * ) Notice: Subject to any disclaimer, the term of this patent is extended or adjusted under 35 U.S.C. 154(b) by 1769 days.

(21) Appl. No.: 11/142,762

(22) Filed: Jun. 1, 2005

(65) Prior Publication Data

US 2006/0275644 A1    Dec. 7, 2006

(51) Int. Cl.
*H01M 8/04* (2006.01)
(52) U.S. Cl. .................................. 429/514; 429/512
(58) Field of Classification Search .............. 429/34
See application file for complete search history.

(56) References Cited

U.S. PATENT DOCUMENTS

| 7,022,430 B2 * | 4/2006 | Enjoji et al. | 429/39 |
| 7,479,341 B2 * | 1/2009 | Takeguchi et al. | 429/34 |
| 2002/0142202 A1 * | 10/2002 | Li et al. | 429/27 |

FOREIGN PATENT DOCUMENTS

WO    WO 02/065566 A1    8/2002

* cited by examiner

*Primary Examiner* — Ula C Ruddock
*Assistant Examiner* — Jacob Marks
(74) *Attorney, Agent, or Firm* — John A. Miller; Miller IP Group, PLC

(57) ABSTRACT

A fuel cell that includes specially configured bipolar plates that separate the reactant gas flow field in an active area of the fuel cell into a primary flow channels and a secondary channels. In one embodiment, the primary flow channels are in use over the entire operating range of the fuel cell and the secondary flow channels are only in use at high cell current outputs. At low power demands, the primary channels operate at a voltage below 0.8 volts and provides a gas current density of more than 0.2 A/cm$^2$. The secondary flow channels have no gas supply and operate at mass transport limited conditions. Because of this design, voltage cycling is significantly reduced or eliminated, thus increasing the life of the fuel cell.

12 Claims, 2 Drawing Sheets

CURRENT

REDUCTION OF VOLTAGE LOSS BY VOLTAGE CYCLE THROUGH THE USE OF SPECIALLY FORMED BIPOLAR PLATES

BACKGROUND OF THE INVENTION

1. Field of the Invention

This invention relates generally to a fuel cell that reduces voltage losses as a result of voltage cycling and, more particularly, to a fuel cell system that includes a bipolar plate that separates the plate flow field in the active area of the fuel cell into a primary domain and a secondary domain so as to reduce the voltage cycling of the fuel cell.

2. Discussion of the Related Art

Hydrogen is a very attractive fuel because it is clean and can be used to efficiently produce electricity in a fuel cell. The automotive industry expends significant resources in the development of hydrogen fuel cells as a source of power for vehicles. Such vehicles would be more efficient and generate fewer emissions than today's vehicles employing internal combustion engines.

A hydrogen fuel cell is an electrochemical device that includes an anode and a cathode with an electrolyte therebetween. The anode receives hydrogen gas and the cathode receives oxygen or air. The hydrogen gas is dissociated in the anode to generate free hydrogen protons and electrons. The hydrogen protons pass through the electrolyte to the cathode. The hydrogen protons react with the oxygen and the electrons in the cathode to generate water. The electrons from the anode cannot pass through the electrolyte, and thus are directed through a load to perform work before being sent to the cathode. The work acts to operate the vehicle.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs are relatively expensive to manufacture and require certain conditions for effective operation. These conditions include proper water management and humidification, and control of catalyst poisoning constituents, such as carbon monoxide (CO).

Several fuel cells are typically combined in a fuel cell stack to generate the desired power. The fuel cell stack receives a cathode input gas, typically a flow of air forced through the stack by a compressor. Not all of the oxygen is consumed by the stack and some of the air is output as a cathode exhaust gas that may include water as a stack by-product. The fuel cell stack also receives an anode hydrogen input gas that flows into the anode side of the stack.

The fuel cell stack includes a series of flow field plates or bipolar plates positioned between the several MEAs in the stack. The bipolar plates include an anode side and a cathode side for adjacent fuel cells in the stack. Anode gas flow channels are provided on the anode side of the bipolar plates that allow the anode gas to flow to the anode side of each MEA. Cathode gas flow channels are provided on the cathode side of the bipolar plates that allow the cathode gas to flow to the cathode side of each MEA. The bipolar plates are made of a conductive material, such as stainless steel, so that they conduct the electricity generated by the fuel cells from one cell to the next cell and out of the stack. The bipolar plates also include flow channels through which a cooling fluid flows.

It has been discovered that a typical fuel cell stack will have a voltage loss or degradation over the lifetime of the stack. It is well known that the fuel cell stack degradation is, among other things, a result of voltage cycling of the stack. The voltage cycling occurs when the platinum catalyst particles used to enhance the electrochemical reaction transition between an oxidized state and a non-oxidized state, which causes dissolution of the particles. If the voltage of the fuel cell stack is less than about 0.8 volts, the platinum particles are not oxidized and remain a metal. When the voltage of the fuel cell stack goes above about 0.8 volts, the platinum particles begin to oxidize. A low load on the stack may cause the voltage output of the fuel cell stack to go above 0.8 volts. The 0.8 volts corresponds to a current density of 0.2 $A/cm^2$, depending on the power density of the MEA, where a current density above this value does not change the platinum oxidation state. The oxidation voltage threshold may be different for different stacks and different catalysts.

When the platinum particles transition from a metal state to an oxidized state, the oxidized ions in the platinum are able to move from the surface of the MEA towards and probably into the membrane. When the particles convert back to the metal state, they are not in a position to assist in the electrochemical reaction, thus reducing the active catalyst surface and resulting in the voltage degradation of the stack.

The known flow field design of the bipolar plates in the stack causes the reactant gases to be uniformly distributed over the entire active area of the fuel cell so as to homogeneously utilize the catalyst for a maximum power output. In applications where the power demand of the stack is dynamic, a dynamic change of cell voltage occurs. This dynamic change of cell voltage has a significant impact on the aging of the cells because of the voltage degradation.

FIG. 1 is a graph with number of voltage cycles on the horizontal axis and normalized platinum surface area on the vertical axis showing that as the number of voltage cycles between the oxidation state and the metal state increases, the platinum surface area decreases causing the voltage degradation of the stack. The degradation will be different for different types of catalysts, including catalysts of different particle sizes, concentrations and compositions.

SUMMARY OF THE INVENTION

In accordance with the teachings of the present invention, a fuel cell is disclosed that includes specially configured flow field plates or bipolar plates that separate the reactant gas flow field in an active area of the fuel cell into a primary domain and a secondary domain. In one embodiment, the reactant gas flow channels are separated into primary flow channels and secondary flow channels, where the primary flow channels have a lower pressure drop than the secondary flow channels at low flow rates (low current density). The primary flow channels are in use over the entire operating range of the fuel cell and the secondary flow channels are only in use at high cell current outputs. At low power demands, the primary channels operate at a voltage below 0.8 volts and provide a current density of more than 0.2 $A/cm^2$. The secondary flow channels do not significantly receive the reactant gas flow and operate at mass transport limited conditions. Because of this design, voltage cycling is significantly reduced or eliminated, thus increasing the life of the fuel cell.

In one embodiment, the flow field plate includes a nozzle section having constricted channel portions for providing the reactant gas flow to the primary flow channels and the secondary flow channels. The channel portions cause the reactant flow to be directed to the primary flow channels at relatively low flow rates and be directed to both the primary flow channels and the secondary flow channels at relatively high flow rates.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a fuel cell including a bipolar plate having reactant gas flow channels separated into primary flow channels and secondary for reducing voltage cycling of the fuel cell is merely exemplary in nature, and is in no way intended to limit the invention or its applications or uses.

Figure 1:
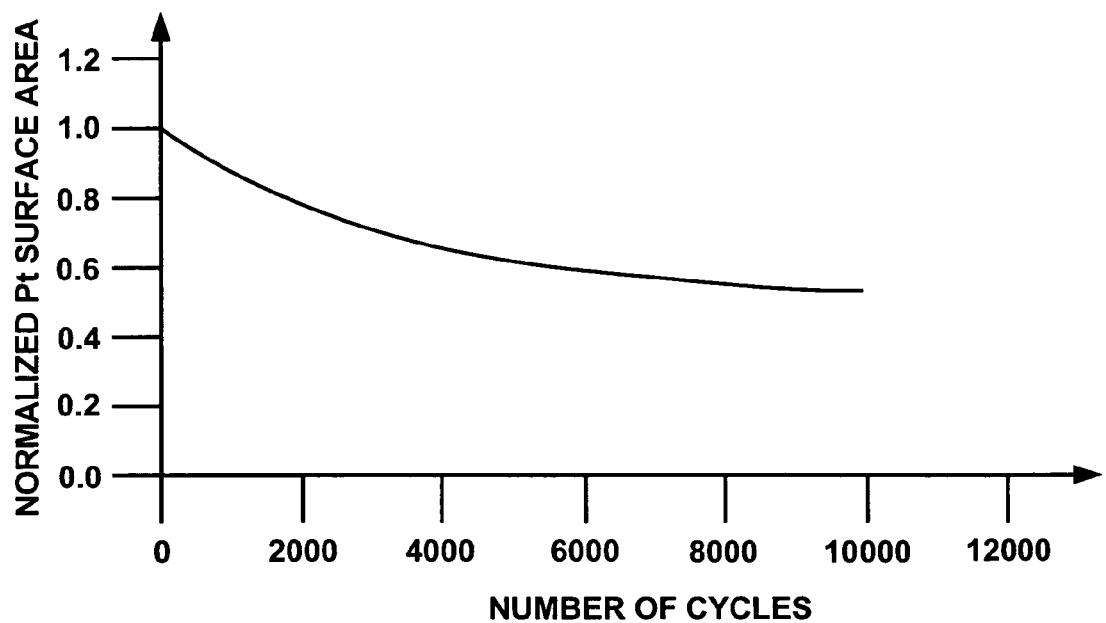
FIG. 1 is a graph with number of voltage cycles on the horizontal axis and platinum surface area on the vertical axis showing the relationship between voltage cycling and reduction of the platinum surface area in a fuel cell.
Figure 2:
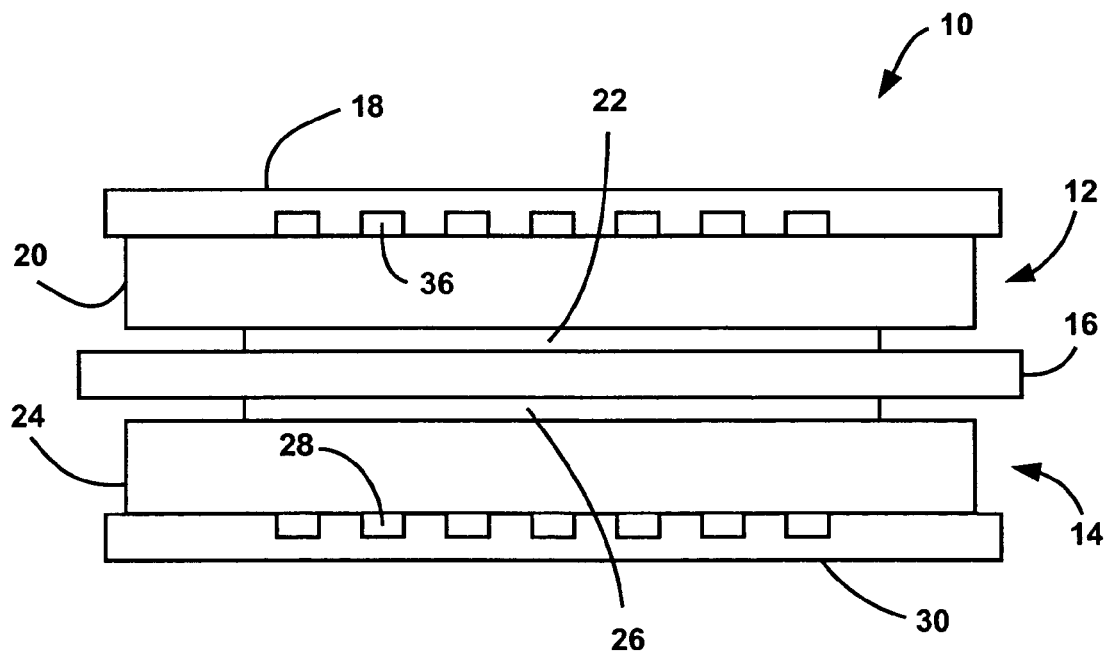
FIG. 2 is a cross-sectional view of a fuel cell in a fuel cell stack that includes a bipolar plate that separates the flow field within the fuel cell into a primary domain and a secondary domain so as to reduce voltage cycling, according to an embodiment of the present invention.

FIG. 2 is a cross-sectional view of a fuel cell 10 that is part of a fuel stack of the type discussed above. The fuel cell 10 includes a cathode side 12 and an anode side 14 separated by an electrolyte membrane 16. A cathode side diffusion media layer 20 is provided on the cathode side 12, and a cathode side catalyst layer 22 is provided between the membrane 16 and the diffusion media layer 20. Likewise, an anode side diffusion media layer 24 is provided on the anode side 14, and an anode catalyst layer 26 is provided between the membrane 16 and the diffusion media layer 24. The catalyst layers 22 and 26 and the membrane 16 define an MEA. The diffusion media layers 20 and 24 are porous layers that provide for input gas transport to and water transport from the MEA. Various techniques are known in the art for depositing the catalyst layers 22 and 26 on the diffusion media layers 20 and 24, respectively, or on the membrane 16.

A cathode side flow field plate or bipolar plate 18 is provided on the cathode side 12 and an anode side flow field plate or bipolar plate 30 is provided on the anode side 14. The bipolar plates 18 and 30 are positioned between the fuel cells in a fuel cell stack. A hydrogen gas flow from flow channels 28 in the bipolar plate 30 reacts with the catalyst layer 26 to dissociate the hydrogen ions and the electrons. Airflow from flow channels 36 in the bipolar plate 18 reacts with the catalyst layer 22. The hydrogen ions are able to propagate through the membrane 16 where they electro-chemically react with the airflow and the return electrons in the catalyst layer 22 to generate water as a by-product.

Figure 3:
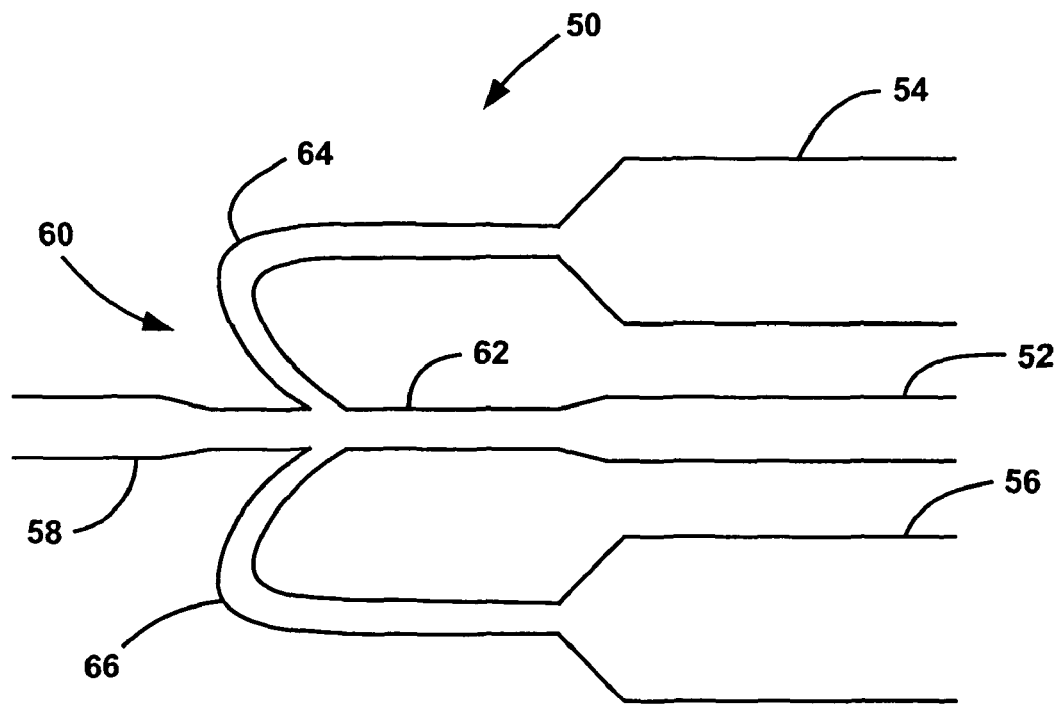
FIG. 3 is a portion of a bipolar plate for a fuel cell that includes primary flow field channels, secondary flow field channels and a specially designed gas distribution section, according to an embodiment of the present invention.

According to the invention, the flow field of the bipolar plates in an active area of the fuel cell 10 are separated into a primary domain and a secondary domain that have different flow properties. One possible implementation of such a flow field is shown in FIG. 3. FIG. 3 is a plan view of a portion of a flow field 50 for either of the bipolar plates 18 or 30. The flow field 50 includes a primary flow channel 52 and secondary flow channels 54 and 56 representing a series of alternating primary and secondary flow channels in the bipolar plate. In this embodiment, the primary flow channel 52 has a smaller diameter than the secondary flow channels 54 and 56 to provide the desired pressure drop in the active area of the flow field, as will be discussed in detail below.

The flow channels 52-56 receive a reactant gas from an inlet pipe 58 that flows through a nozzle section 60 that is part of the gas distribution section of the bipolar plate. The nozzle section 60 includes a stepped down constricted pipe portion 62 between the inlet pipe 58 and the primary channel 52 where the reactant gas increases its momentum as it flows from the inlet pipe 58 to the channels 52-56. Further, a restricted channel portion 64 is provided between the pipe portion 62 and the secondary flow channel 54 and a restricted channel portion 66 is provided between the pipe portion 62 and the secondary channel 56 to provide inlet pipes to the secondary flow channels 54 and 56, as shown. The nozzle section 60 is configured in this manner so that the primary flow channel 52 has a lower pressure drop than the secondary flow channels 54 and 56.

The reactant gas flow is accelerated in the restricted pipe portion 62 and the channel portions 64 and 66 of the nozzle section 60 so that its momentum is increased. As a result of the flow inertia, a relatively large force is needed to direct the reactant gas flow through the channel portions 64 and 66 to the secondary channels 54 and 56, respectively. In other words, because the nozzle section 60 provides a lower pressure drop across the primary channel 52, additional force is needed to cause the reactant gas to flow into the channel portions 64 and 66. The pressure drop across the channel portions 64 and 66 has to be equal to or slightly less than the pressure drop across the flow channels 62.

At low flow rates, most of the reactant gas flows into the primary flow channel 52. When the power demand is increased, the flow rate from the inlet pipe 58 is increased so that the pressure drop in the primary flow channel 52 is increased. This increase of the reactant gas flow rate in the primary flow channel 52 leads to an increasing pressure drop that provides the energy that is needed to overcome the inertia and direct the reactant gas flow into the channel portions 64 and 66 and the channels 54 and 56, which now has a smaller pressure drop than the primary flow channel 52 and the pipe portion 62. Other gas distribution section designs within the scope of the present invention can provide the same change in pressure drop between the primary flow channel 52 and the secondary flow channels 54 and 56 to achieve the same result.

In one embodiment, the primary flow channels are in use over the entire operating range of the fuel cell 10 and the secondary flow channels are only in use at relatively high cell current outputs or high stack power demands. In other words, for low load demands on the fuel cell stack, reactant gas is provided to only the primary flow channels so that the electrochemical reaction in each fuel cell in the stack is reduced to such a degree so as to prevent the output voltage across the stack from being greater than about 0.8 volts. At low power demands, the primary channels operate at a voltage below 0.8V and provide a gas current density of more than about 0.2 A/cm$^2$. The secondary flow channels have no gas supply at low demands and operate at mass transport limited conditions. Because of this design, voltage cycling is significantly reduced or eliminated, thus increasing the life of the fuel cell 10. In other words, the flow field provided by the bipolar plate makes it possible to reduce the number of voltage cycles of the fuel cell 10 above 0.8 volts and below 0.8 volts, therefore providing less cell degradation losses. Because the secondary flow channels are at the same voltage potential as the primary flow channels, cell reversal is prevented.

Figure 4:
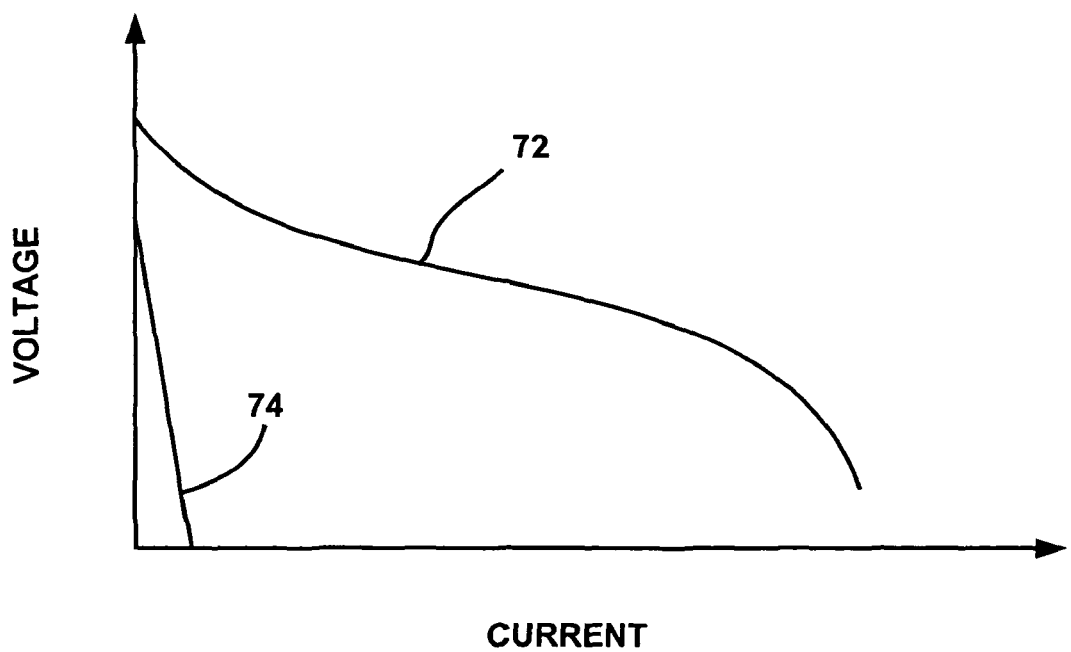
FIG. 4 is a graph with current on the horizontal axis and voltage on the vertical axis showing polarization curves for a primary domain and a secondary domain of a flow field in an active area of a fuel cell.

FIG. 4 is a graph with current on the horizontal axis and voltage on the vertical axis showing a polarization curve 72 for the primary flow channels and a polarization curve 74 for the secondary flow channels in the active area of a fuel cell for low flow rates. The polarization curve 72 is for both the primary flow channels and the secondary flow channels for high flow rates.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A fuel cell comprising at least one flow field plate including a plurality of flow channels that receive a reactant gas flow, wherein the flow channels are in an active region of the fuel cell and are separated into primary flow channels and secondary flow channels, said primary flow channels have one flow property and said secondary flow channels having another flow property so that the primary flow channels and the secondary flow channels have different reactant gas flow distributions, said at least one flow field plate further including a nozzle section having constricted channel portions for providing the reactant gas flow to the primary flow channels and the secondary flow channels, said constricted channel portions causing the reactant flow to be directed to the primary flow channels at sufficiently low flow rates and be directed to both the primary flow channels and the secondary flow channels at sufficiently high flow rates and wherein the primary flow channels are in operation over an entire current output operating range of the fuel cell and the secondary flow channels are in operation only for high current outputs of the fuel cell.

2. The fuel cell according to claim 1 wherein the primary flow channels have a lower pressure drop than the pressure drop of the secondary flow channels at low flow rates.

3. The fuel cell according to claim 1 wherein a voltage output across the fuel cell is maintained below about 0.8 volts.

4. The fuel cell according to claim 1 wherein the diameter of the secondary flow channels is greater than the diameter of the primary flow channels.

5. The fuel cell according to claim 1 wherein the primary flow channels and the secondary flow channels reduce voltage cycling of the fuel cell.

6. The fuel cell according to claim 1 wherein the flow channels provide an anode hydrogen reactant gas flow.

7. The fuel cell according to claim 1 wherein the flow channels provide a cathode reactant gas flow.

8. The fuel cell according to claim 1 wherein the fuel cell is part of a fuel cell stack.

9. A fuel cell including a cathode side and an anode side, said fuel cell comprising:
    a cathode side flow field plate including a plurality of cathode flow channels that receive an air flow, wherein the cathode flow channels are separated into primary cathode flow channels and secondary cathode flow channels, and wherein the primary cathode flow channels have a lower pressure drop than the pressure drop of the secondary cathode flow channels;
    an anode side flow field plate including a plurality of anode flow channels that receive a hydrogen gas flow, wherein the anode flow channels are separated into primary anode flow channels and secondary anode flow channels, and wherein the primary anode flow channels have a lower pressure drop than the pressure drop of the secondary anode flow channels; and
    an electrolyte membrane positioned between the cathode side flow field plate and the anode side flow field plate, said membrane receiving the air flow and the hydrogen gas flow, wherein the primary anode and cathode flow channels are in operation over an entire current output operating range of the fuel cell and the secondary anode and cathode flow channels are in operation only for high current outputs of the fuel cell so as to reduce voltage cycling of the fuel cell.

10. The fuel cell according to claim 9 wherein an output voltage of the fuel cell is maintained at a voltage less than about 0.8 volts.

11. The fuel cell according to claim 10 wherein the diameter of the primary anode and cathode flow channels is less than the diameter of the secondary anode and cathode flow channels.

12. The fuel cell according to claim 9 further comprising a nozzle section including constricted channel portions for providing the reactant gas flow to the primary flow channels and the secondary flow channels in both the cathode side flow field plate and the anode side flow field plate, said channel portions causing the reactant flow to be directed to the primary flow channels at relatively low flow rates and be directed to both the primary flow channels and the secondary flow channels at relatively high flow rates.

* * * * *